United States Patent
Salem et al.

(10) Patent No.: US 7,265,473 B2
(45) Date of Patent: Sep. 4, 2007

(54) REDUCTION OF CORE-END LOSSES OF DYNAMOELECTRIC MACHINES BY USING LOWER CORE LOSS IRON SILICON PUNCHING

(75) Inventors: Sameh R. Salem, Rexford, NY (US); Judson Sloan Marte, Wynantskill, NY (US); Jeffrey Michael Breznak, Waterford, NY (US); Manoj Ramprasad Shah, Latham, NY (US); Russell Earle Walthers, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 372 days.

(21) Appl. No.: 10/649,784

(22) Filed: Aug. 28, 2003

(65) Prior Publication Data
US 2005/0046300 A1   Mar. 3, 2005

(51) Int. Cl.
*H02K 1/00* (2006.01)
(52) U.S. Cl. ......................... 310/216; 29/596
(58) Field of Classification Search ............... 310/254, 310/217, 216; 29/596
See application file for complete search history.

(56) References Cited

U.S. PATENT DOCUMENTS

| | | | | |
|---|---|---|---|---|
| 2,456,982 A | * | 12/1948 | Moore | 318/3 |
| 3,812,392 A | * | 5/1974 | Barton et al. | 310/259 |
| 4,399,949 A | * | 8/1983 | Penn et al. | 242/433 |
| 4,607,183 A | | 8/1986 | Rieber et al. | |
| 4,984,353 A | * | 1/1991 | Santandrea et al. | 29/714 |
| 5,172,020 A | * | 12/1992 | Hibino et al. | 310/26 |
| 6,177,748 B1 | * | 1/2001 | Katcher et al. | 310/209 |
| 6,191,510 B1 | * | 2/2001 | Landin et al. | 310/254 |
| 6,218,760 B1 | * | 4/2001 | Sakuragi et al. | 310/254 |
| 6,396,188 B1 | | 5/2002 | Kliman et al. | |
| 6,429,567 B1 | | 8/2002 | Shah et al. | |
| 6,462,457 B2 | | 10/2002 | Shah et al. | |
| 6,489,781 B1 | | 12/2002 | Kliman et al. | |
| 6,525,444 B2 | | 2/2003 | Salem et al. | |
| 6,540,944 B2 | | 4/2003 | Duggal et al. | |
| 6,608,419 B2 | | 8/2003 | Shah et al. | |
| 6,803,693 B2 | * | 10/2004 | Shah et al. | 310/216 |
| 7,057,324 B2 | * | 6/2006 | Breznak et al. | 310/216 |

* cited by examiner

*Primary Examiner*—Dang Le
*Assistant Examiner*—Nguyen N. Hanh
(74) *Attorney, Agent, or Firm*—Nixon & Vanderhye P.C.

(57) ABSTRACT

Electric machines can be improved or uprated to reduce core-end losses using lower core loss material such as high grade iron silicon. A machine uprating entails removing at least a last one of the stacked lamination packages at each end of the stator core, and re-stacking the removed lamination packages with the lower core loss material.

4 Claims, 2 Drawing Sheets

REDUCTION OF CORE-END LOSSES OF DYNAMOELECTRIC MACHINES BY USING LOWER CORE LOSS IRON SILICON PUNCHING

BACKGROUND OF THE INVENTION

The present invention relates to methods and structures for uprating or improving electric machines and, more particularly, to reducing core-end losses of dynamoelectric machines using lower core loss iron silicon.

Generator power output is limited by significant heat buildup on the extreme ends of the generator field due to high eddy current losses. The flux associated with the field induces eddy currents in the stator teeth, and penetrates several inches into the stator core. The heating caused by the eddy currents is a limiting factor in the design of large electric machines. In addition, the axial fluxes add onto the normal radial fluxes in the end packages, increasing the level of saturation in the end teeth and yoke. The effect of reducing radial flux entering the first and second packages is to lower the level of saturation in these packages, enabling the axial flux to turn radially closer to the core end. The resultant effect is to lower the axial flux densities, and therefore the iron temperatures.

Many ways are being used to reduce the electromagnetic flux normal to the stator core-end that causes eddy current losses and heating. Increasing the air-gap length toward the end of the stator core reduces such core end flux. Core-end stepping is one of the commonly used techniques to modify the air-gap length in the core-ends (see FIG. 1). Reducing the relative axial length of the rotor with respect to the stator is another way to reduce the core end fringing flux. The amount of stepping is limited, however, by the need to support the lamination "teeth" from flexing. Loose lamination teeth will flutter and break off causing machine failure. These fixes also increase the excitation needs contributing to lower efficiencies and potentially a bigger thermal challenge.

BRIEF DESCRIPTION OF THE INVENTION

In an exemplary embodiment of the invention, a method of uprating electric machines including a stator core with stacked lamination packages includes removing at least a last one of the stacked lamination packages at each end of the stator core, and re-stacking the removed lamination packages with a lower core loss material.

In another exemplary embodiment of the invention, an electric machine includes a stator having a stator core with stacked lamination packages. At least a last one of the stacked lamination packages at each end of the stator core includes a lower core loss material than a remainder of the stacked lamination packages.

DETAILED DESCRIPTION OF THE INVENTION

It is desirable to reduce losses and heating, especially in the generator or motor core-ends without sacrificing reliability, efficiency, and performance of the machine. The invention increases the potential to uprate electric machines by partially re-stacking the core-end laminations. This advancement would also help further optimize new machines.

Figure 1:
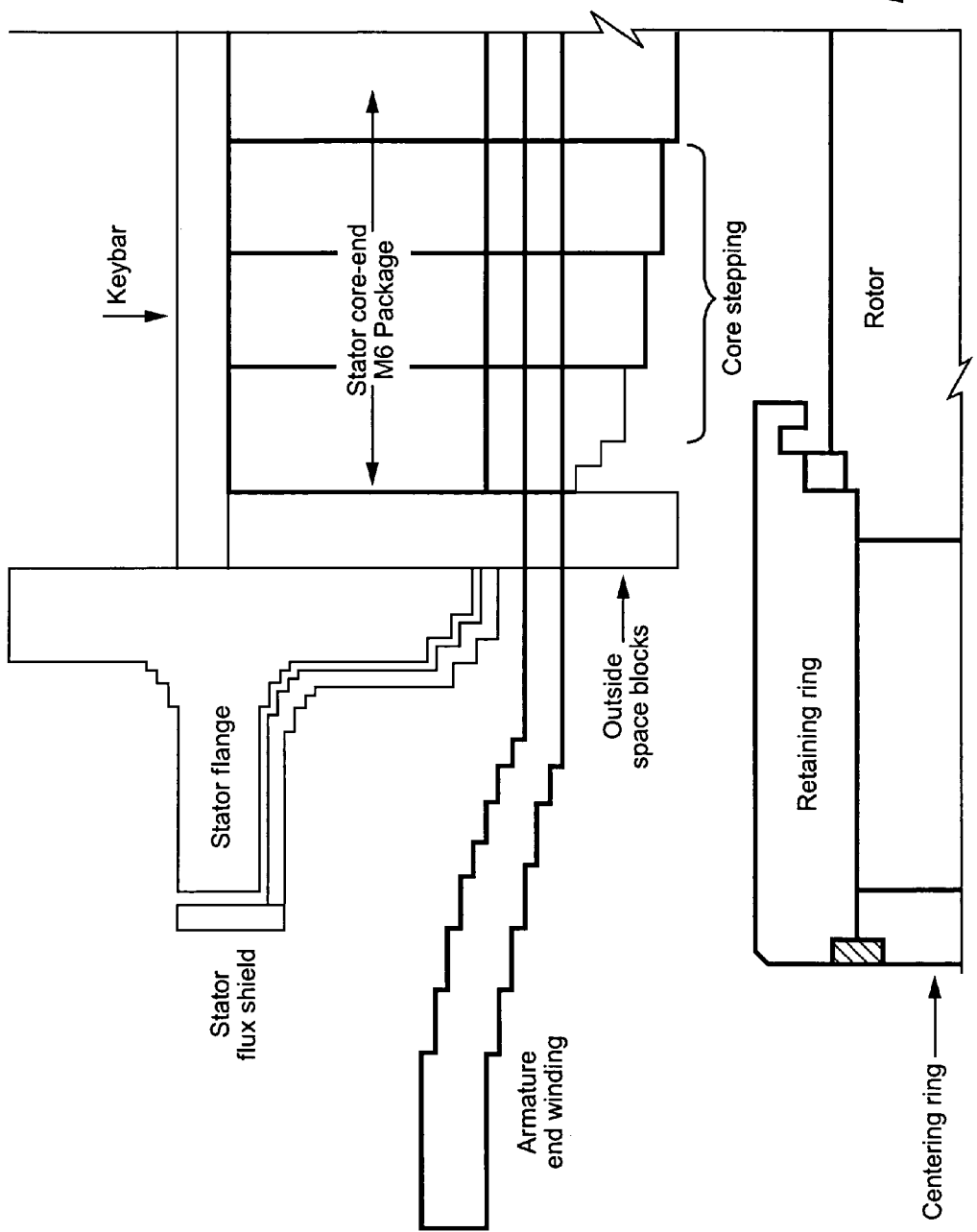
FIG. 1 illustrates a conventional stator core with core-end stepping.
Figure 2:
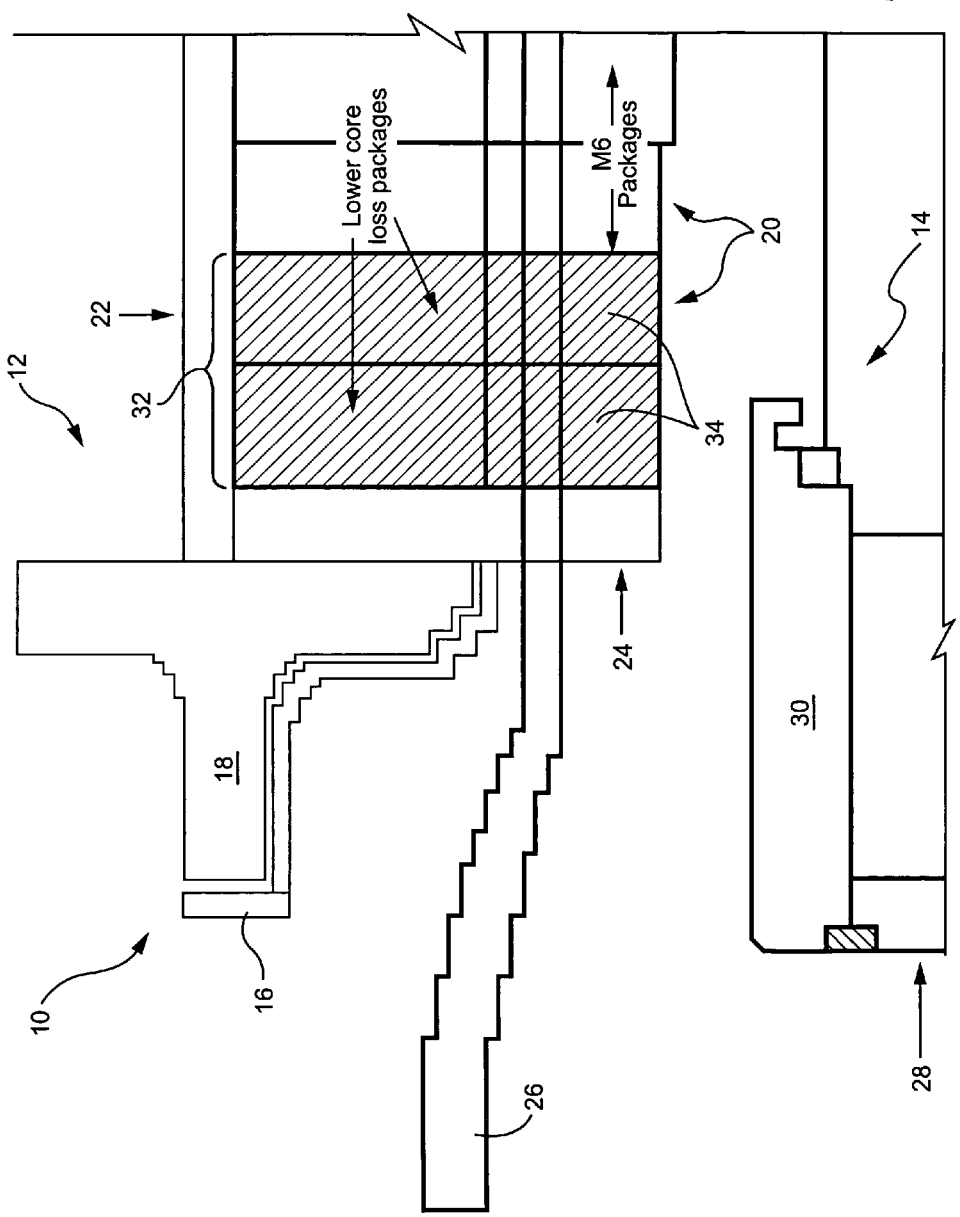
FIG. 2 shows the stator core using lower core loss iron silicon punching at the core-end.

With reference to FIG. 2, a dynamoelectric machine 10 includes conventional components as shown such as a stator 12 and a rotor 14. The stator 12 is composed of a stator flux shield 16, a stator flange 18, and stacked lamination packages 20 secured via keybars 22 and outside space blocks 24. The armature end winding 26 is also shown. The rotor 14 includes a suitable centering ring 28 and a retaining ring 30. As noted, these conventional machine components are known, and the detailed construction thereof does not form part of the present invention. Details of their structure and function will thus not be described.

The stator core end 32 may suffer from electromagnetic losses and heating as discussed above. The electromagnetic losses and the consequent heating in generator or motor core-ends can be reduced, however, by using lower core loss iron silicon punching 34 at the core-end 32. Lower core loss iron silicon punching could be used in the last one or more lamination packages of the stator core. Higher grade iron silicon grain-oriented punching has with-grain core losses lower than the conventional M-6 grain-oriented iron silicon punching. The mechanical properties of the lower core loss iron silicon punching, such as M-4 (higher grade iron silicon punching), are similar to the conventional M-6 grain-oriented iron silicon punching. Lower loss iron silicon punching lamination thickness could be similar to the conventional M-6 iron silicon punching; therefore, the stacking factor will be the same for both materials. The lower loss iron silicon core end punching material is particularly suited for generator uprate, by a partial re-stacking of the core-end to reduce the core-end loss and temperatures. As noted, this advancement also helps to further optimize new machines.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of uprating electric machines including a stator core with stacked lamination packages, the method comprising:
   removing at least a last one of the stacked lamination packages at each end of the stator core; and
   re-stacking the removed lamination packages with a lower core loss material.

2. A method according to claim 1, wherein the stacked lamination packages comprise grain-oriented iron silicon punching (M-6) having a with-grain core loss of about 0.573 at 1.5 T (W/lb), and wherein the re-stacking step comprises re-stacking the removed lamination packages with a higher grade grain-oriented iron silicon punching having a with-grain core loss less than M-6.

3. A method according to claim 1, wherein the re-stacking step comprises re-stacking the removed lamination packages with M-4 iron silicon punching.

4. An uprated electric machine assembled according to the method of claim 1.

* * * * *